UNITED STATES PATENT OFFICE.

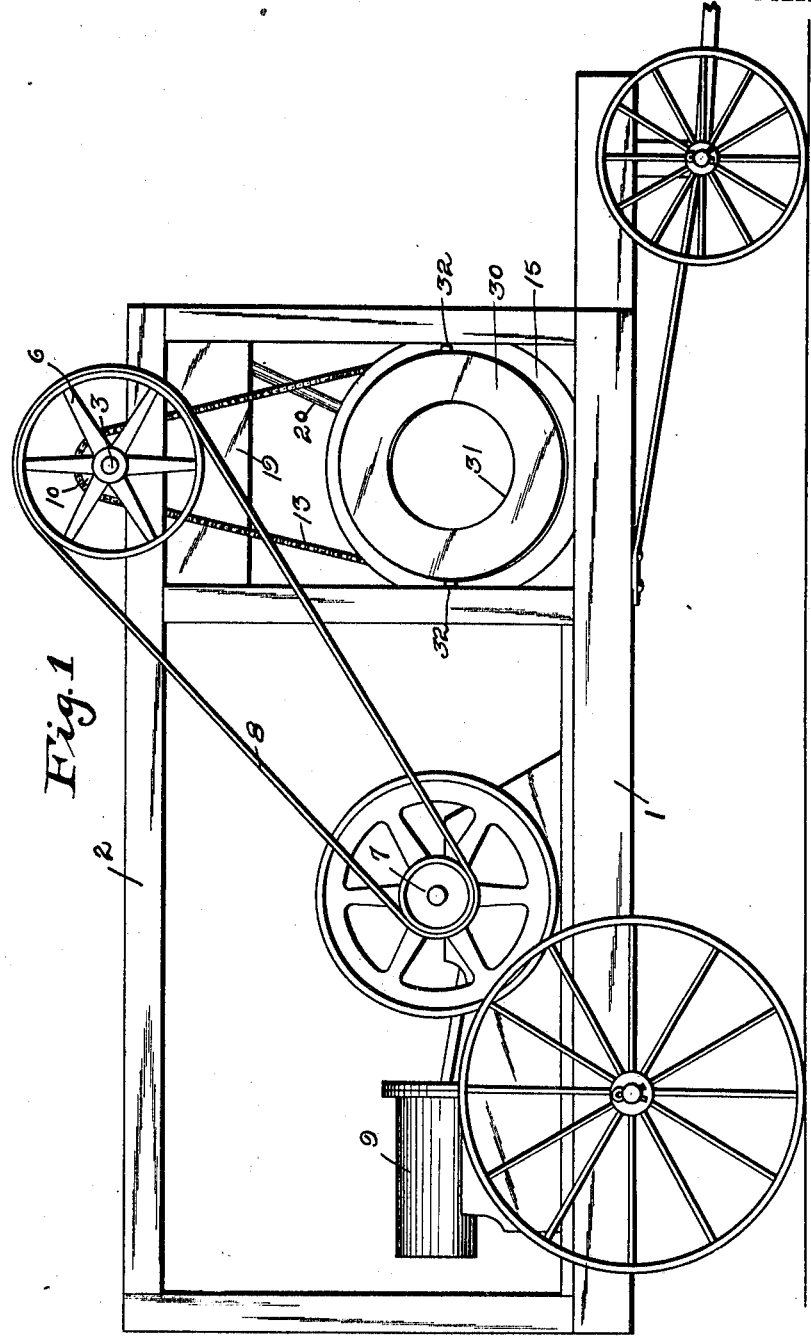

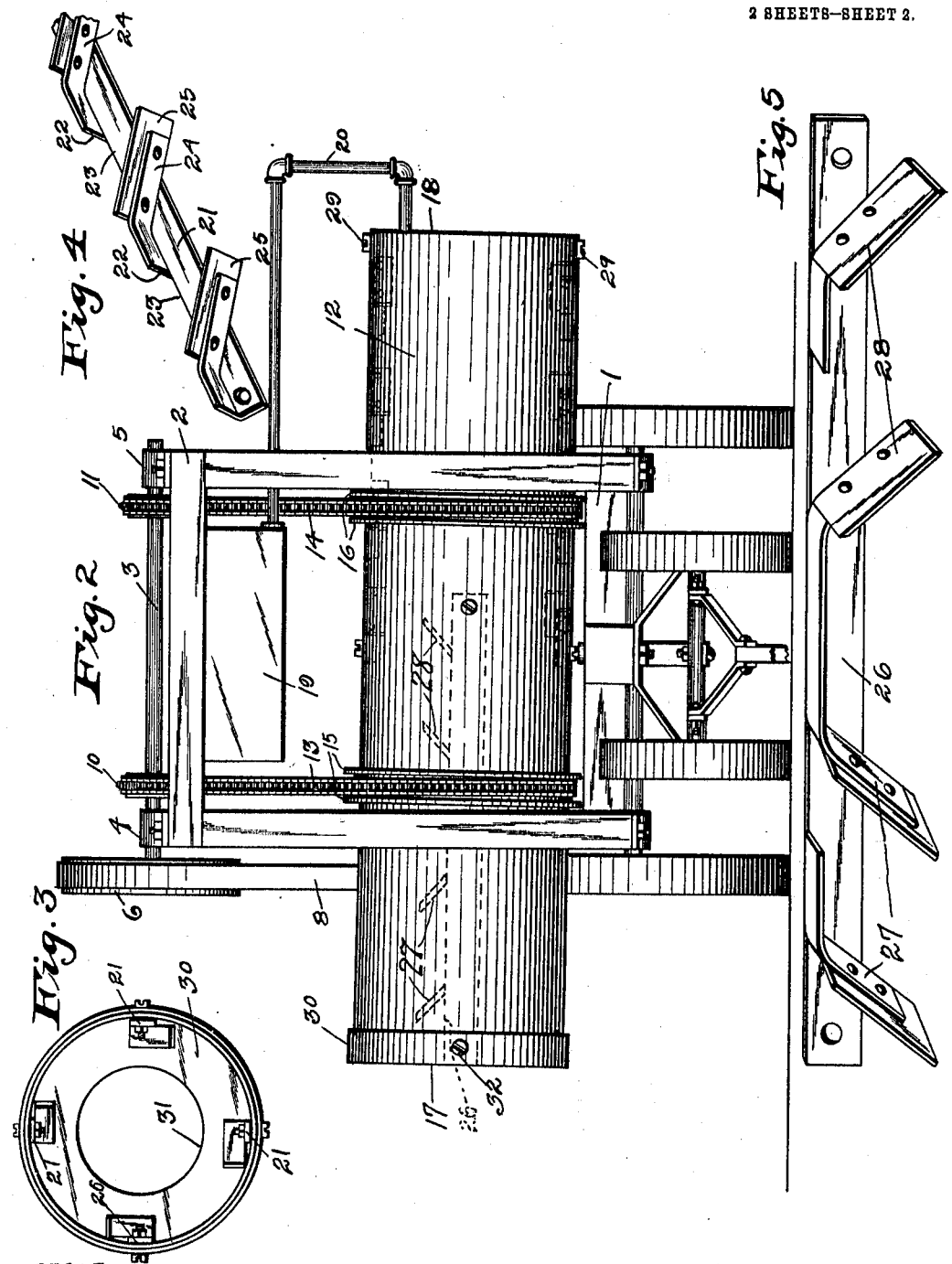

OSLER ISAAC OVERTURF, OF DUMONT, IOWA, ASSIGNOR TO LOUIE H. OVERTURF AND MILTON SCHULER, OF DUMONT, IOWA.

CONCRETE-MIXER.

1,004,586. Specification of Letters Patent. Patented Oct. 3, 1911.

Application filed August 11, 1910. Serial No. 576,738.

*To all whom it may concern:*

Be it known that I, OSLER ISAAC OVERTURF, a citizen of the United States, residing at Dumont, county of Butler, and State of Iowa, have invented a new and useful Improvement in Concrete-Mixers, of which the following is a specification.

My invention relates to mixing devices for concrete, mortar and the like, and has for its object the provision of a mixing drum having a novel form of blades, so arranged as to subject the ingredients in the drum to a thorough mixing action while the material is being advanced from the feed end to the discharge end of the drum.

A further object of my invention is to secure the mixing blades to the drum, so that they may be readily removed therefrom when occasion requires as, for instance, for cleaning.

These and other objects and advantages of my invention will become apparent from the detailed description of the drawings, in which—

Figure 1 is a side elevation of my improved form of mixer mounted upon a suitable vehicle for transportation purposes; Fig. 2 is a front end view of the mechanism shown in Fig. 1; the mixing blades being shown in dotted lines. Fig. 3 is an end view of the drum looking from the discharge end toward the feed end, showing the arrangement of the blades upon the interior of the drum; Fig. 4 is a view in perspective of a portion of a deflector bar provided with parallel blades; and Fig. 5 is a general view of a deflector bar provided with diverging blades.

Referring to Fig. 1, the vehicle 1 carries the supporting frame 2, on top of which is mounted the power shaft 3. This shaft is rotatably journaled in bearings 4 and 5. To one end of the shaft is secured the large wheel or pulley 6, which is operatively connected with the small wheel 7 by a suitable connection such as the belt 8. The small wheel 7 is adapted to be rotated by any suitable source of power, as, for instance, the engine 9 mounted upon the vehicle. The power shaft 3 is provided with a pair of sprockets 10 and 11. The mixing drum 12 is rotatably supported from the power shaft 3 by means of sprocket chains 13 and 14, which pass around the drum and around their respective sprockets 10 and 11. The shoulders 15, 15, and 16, 16, on the drum, provide run-ways for the sprocket chains. If desired, these run-ways may be provided with teeth or gripping surfaces for the chains. The length of the chains is so regulated that the cylindrical drum is inclined downwardly from the feed end 17 to the discharge end 18 at any desired angle from the horizontal, depending upon the rate of travel which it is desired to give the material in its passage through the drum. From the water tank 19, supported by the frame-work 2, leads a pipe 20 into the interior of the drum for mixing the desired amount of water with the ingredients in the drum.

As seen in dotted lines in Fig. 2, and in full lines in Fig. 4, the mixing blades are carried by bars 21. These bars are made of angle iron which is L-shaped in cross-section. The mixing blades are formed integral with these bars by cutting the latter at the points 22 and along the lines 23, and then bending the cut-out portions laterally of the main body portion of the bar. This is clearly indicated in the detailed view of Fig. 4. These laterally bent portions or sections form the blades 24. The angle at which these blades may be bent from their normal or unbent position, may be varied in accordance with the particular mixing effect which it is desired that these blades shall produce. I have found that when the blades make an angle of about 45 degrees from the flange portion of the bar, the position of the blades is about right. To give the blades large contact areas, I provide them with sheet metal plates or extensions 25 which are bolted or riveted to the blades. The number of blades carried by each bar may be varied in accordance with the size of the drum to which they are to be attached. For the sake of illustration, I have in Fig. 1 indicated the bars as provided each with four blades. The three deflector bars, as the bars 21 may properly be called, indicated in dotted lines in Fig. 2, have their blades arranged in parallel lines and are constructed as shown in Fig. 4. It will be noticed that these blades extend in a direction from the feed end of the drum toward the discharge end, so that as the drum is rotated counter-clock-wise, the action of these blades will be to advance the material from the feed end toward the discharge end.

By referring to Fig. 3, it will be seen that there are four deflector bars arranged within the drum in opposite pairs. In Fig. 2 only three deflector bars are indicated in dotted lines, and these three deflector bars, as already stated, are of the kind shown in Fig. 4. The fourth deflector bar, shown at the right of Fig. 3, is not indicated in Fig. 2, because it is located at the farther end of the drum as Fig. 2 is viewed. This fourth deflector bar is indicated by the reference numeral 26 and is shown in detail in Fig. 5. The deflector bar 26 differs from the deflector bars 21 in having the blades arranged so that some of them will advance the material toward the discharge end of the drum, and others will throw the material back toward the feed end of the drum. The blades on the bar 26 are formed similarly to the blades on the bars 21—namely by cutting the flange portion of the L-shaped bar laterally and vertically and then bending the cut-out section laterally to the desired angle. On the bar 26 the blades 27 extend oppositely to the blades 28. The blades 28, like the blades 24 on the bars 21, extend in a direction toward the discharge end of the drum, so as to advance the material toward the discharge end. The oppositely extending blades 27 throw the material back toward the feed end of the drum. The bar 26 is arranged diametrically opposite one of the bars 21, while the rear bars 21, shown at the top and bottom of the drum in Figs. 2 and 3, are arranged in staggered relation to the bar 26 and its opposite bar 21. The bars are of a length sufficient to cause overlapping of the same, as indicated in Fig. 2. The deflector bars are removably secured to the drum by suitable fastening devices, such as bolts 29. As these bolts may be quickly loosened the deflector bars may be readily detached from the drum, as for cleaning purposes. The feed end of the drum is provided with a head 30 having a feed opening 31. The bolts 32, which secure the head to the drum, at the same time pass through one end of the front deflector bars, the rear end of these deflector bars being secured by bolts passing through the body of the drum. By thus having a common fastening means for the drum head and the front deflector bars, less work is required for the removal of the drum head and the front deflector bars.

The operation of the mixing drum will now be clearly understood from the foregoing description. As the drum is rotated the material in the drum is picked up by the blades as they move upwardly, and scattered toward the discharge end of the drum. While the mixing blades are in the material they thoroughly agitate the same toward the discharge end, thus intermixing the different ingredients. This mixing action is promoted and intensified by the blades 27 which may properly be called the reverse blades, as distinguished from the blades 28 and 24, which may properly be termed the advance blades. As the material is shoveled into the drum at the feed end, the reverse blades throw part of the injected material back toward the feed end where it encounters other entering material. There thus takes place near the feed end of the drum a thorough mixing of the material before it is forced by the advance blades toward the discharge end.

While I have shown and described one specific embodiment of my invention, I would have it understood that changes and modifications may be resorted to without departing from the scope of the invention, as defined in the appended claims.

Having thus described my invention, what I claim as new, and desire to secure by Letters Patent of the United States is:

1. A deflector for mixing drums, consisting of an angle bar having a main body portion and a flange portion at substantially right angles thereto, said flange portion having a plurality of sections cut out and bent laterally at a suitable angle to form mixing blades, each section being provided with an enlarged contact portion.

2. A deflector for mixing drums, consisting of an angle bar having a main body portion and a flange portion at substantially right angles thereto, said flange portion having a plurality of sections cut out and bent laterally at a suitable angle to form mixing blades, said blades being arranged in two sets, the blades of each set being parallel and extending oppositely to the blades of the other set.

3. A deflector for mixing drums, consisting of an angle bar having a main body portion and a flange portion at substantially right angles thereto, said flange portion having a plurality of parallel sections cut out and bent laterally at a suitable angle, and a metal plate secured to each section to provide a blade of large contact area.

4. A deflector for mixing drums, consisting of an angle bar having a main body portion and a flange portion at substantially right angles thereto, said flange portion having a plurality of sections cut out and bent laterally at a suitable angle to form mixing blades, a plate secured to each section to provide a blade of large contact area, said blades being arranged in sets, the blades of each set being parallel and extending oppositely to the blades of the other set.

5. In a mixer of the class described, a deflector bar having two central sections bent at an angle to each other, a pair of end sections bent each substantially parallel to the adjacent central section, and a plate secured to each section.

6. In a mixer of the class described, a drum having a closed cylindrical shell, a deflector bar arranged within said closed shell, said bar comprising a main body portion and a flange portion at substantially right angles thereto, said flanged portion having a plurality of short integral sections cut out and bent laterally at a suitable angle to form mixing blades, and fastening devices passing through said main body portion for securing the bar to the inner face of said closed shell.

OSLER ISAAC OVERTURF.

Witnesses:
W. W. TAWNE,
H. A. OVERTURF.

Copies of this patent may be obtained for five cents each, by addressing the "Commissioner of Patents, Washington, D. C."